G. W. WHITEMAN.
SCREW.
APPLICATION FILED JULY 1, 1916.

1,229,560.

Patented June 12, 1917.

Inventor:
George W. Whiteman
by his Attorneys.
Howson & Howson

UNITED STATES PATENT OFFICE.

GEORGE W. WHITEMAN, OF PHILADELPHIA, PENNSYLVANIA.

SCREW.

1,229,560.  Specification of Letters Patent.  Patented June 12, 1917.

Application filed July 1, 1916. Serial No. 107,085.

*To all whom it may concern:*

Be it known that I, GEORGE W. WHITEMAN, a citizen of the United States, residing in Philadelphia, Pennsylvania, have invented certain Improvements in Screws, of which the following is a specification.

My invention relates to threaded securing members, more particularly to screws of the type employed for securing heavy wooden structures together, railroad rails to ties, &c., although the features constituting the subject of my invention may be applied to other forms or styles of screws employed in wood.

In the usual practice of making screws of this character, the helical thread of the same is formed in any approved manner on a round or relatively round rod; the bottom of the root lying in or defining a helical line formed on the surface of a cylinder coaxial with the rod. While screws of this type are always entered into prepared holes, they offer considerable resistance when they are forced into a tie or other wooden member; tearing and straining the fibers of the wood adjacent the wall of their seat or socket.

The object of my present invention is to provide an improved form of wood screw, by the use of which the fibers of the wood, instead of being torn adjacent the wall of the socket into which the screw is entered, will be compressed and disposed adjacent said socket in a position where they will act protectively to prevent moisture and acids of the wood from gaining access to the metal of the screw.

Figure 1:
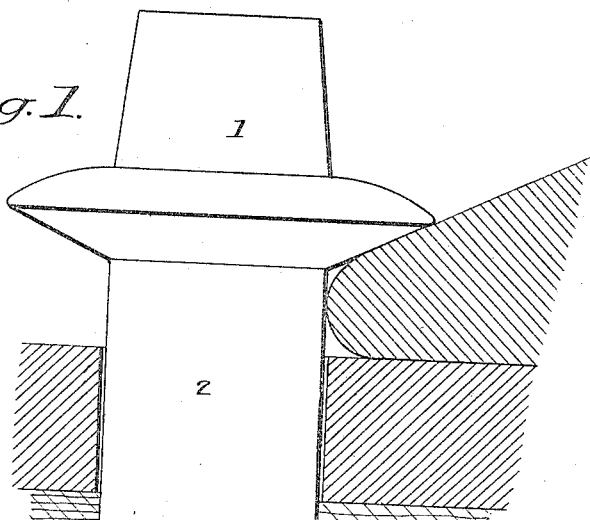
Figure 2:
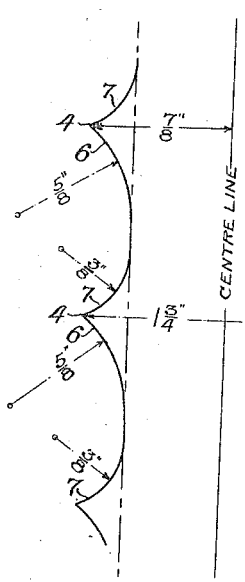
Figure 2:
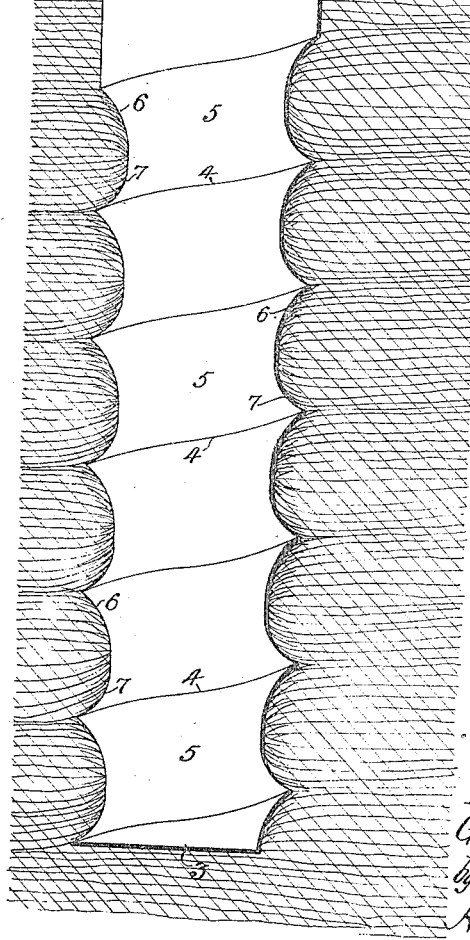

These and other features of my invention are more fully described hereinafter, reference being had to the accompanying drawings, in which:

Figure 1, is an elevation of an improved rail-securing screw having and containing the features constituting the subject of my invention, and Fig. 2, is a diagrammatic view illustrating the contour of the improved thread constituting my invention.

In the drawings, 1 represents the head of a screw of the type to which my invention has been applied, having a stem 2; the lower portion 3 of which stem is reduced in the formation of the thread 4, and this reduced portion has substantially the same diameter as that of the helical surface defining the bottom of the root portions 5 between the runs of the thread, the surfaces of which cylindrical root portions between the threads are tangent to curved walls or surfaces 6 and 7 constituting the lower and upper faces respectively of the continuous thread 4.

The total root space between the runs of the thread 4 is concave, but the curve of the concavity is not continuous since it is formed by arcs of circles having different radii and whose centers are disposed in different planes. By this means I am able to provide the screw stem with a relatively sharp cutting thread and between the same a concaved surface which will compress and hold together the end fibers of the wood terminating at the surface of the socket into which the screw is entered. Moreover, the concaved rounded surfaces between the sharp thread offer less resistance when entering the wood.

In the diagrammatic view illustrated in Fig. 2, the dimensions of the screw are enlarged, and the proportions are substantially as follows:

The external diameter of the thread is substantially one and three-fourths ($1\frac{3}{4}$) inches; the upper concaved surfaces 6 of the root portion joining the apex of such thread are on arcs of circles whose radius is five-eighths ($\frac{5}{8}$) of an inch, the centers of which are disposed on the surface of a cylinder coaxial with the screw and lying beyond the maximum diameter of the thread, while the lower concaved surfaces 7 of the root portion are on the arcs of circles whose radius is three-eighths ($\frac{3}{8}$) of an inch, and whose centers are disposed on a cylindrical surface whose diameter is greater than the maximum diameter of the thread but less than that of the cylindrical surface on which the centers of the arcs forming the surfaces 6 are disposed.

As may be evident, therefore, the curvature of the upper surface 6 on the under side of the thread throughout its length is broader and much less acute than the curvature of the lower surface 7 which forms the upper side of the thread. This construction or arrangement avoids tearing or straining of the fibers of the wood as the screw is entered into its socket and, additionally, effects condensation or compacting of the fibers of the wood adjacent the stem of the screw, as indicated at 8, whereby said fibers are substantially sealed against flow of moisture and acids of the wood, avoiding on the one hand deterioration of the wood around the metal, and on the other destruction of the screw.

In effecting this compacting, it will be understood that the greater pressure will be exerted by the long broader curved surface 6 on the under side of the thread; such pressure being downward as the screw is entered into the wood, while the least amount will be effected by the curved surface 7 of the upper side of the thread, and for this reason the curvature at that point is much sharper than the curvature on the under side.

The rounded recessed portion between the threads will greatly facilitate the entrance of such a screw into a wooden member or tie, and in some instances, the stems of the screws may taper slightly so that the pressure applied by the rounded recesses between the threads will have the effect of more effectually compressing the ends of the fibers lying between the runs of said thread.

The general dimensions of a screw made in accordance with my invention are substantially those of ordinary screws heretofore in use for a similar purpose, but the shape of the thread formed by the curved surfaces 6 and 7 which join the apex of the same is of the special character illustrated in the respective views of the drawings, and the curved surfaces illustrated join a substantially cylindrical portion lying longitudinally within the body of the screw stem.

My improved screw is of the blunt type, requiring the preparation of a hole in the wood part or tie in which it is entered. It will be understood, however, that my improved thread construction may be applied to the so-called "gimlet-pointed" screws.

It is further believed that my improved screw will offer greater resistance to withdrawal; the turned ends of the wood fibers offering an increased resistance to any shearing action by the threads which might take place should vertical strain be applied to the screw to lift it from its seat.

I claim:

1. A screw having a stem with the usual helical thread, with a continuous concavely curved recess between the turns of said thread; the concaved surface adjacent one side of the thread being broader than the concaved surface adjacent the other side of the thread throughout the length of the latter.

2. A screw having a stem with the usual helical thread having a sharp edge, with a continuous concaved recess between the turns of said thread, said concaved recess including a plurality of arcuate surfaces having radii of different length and lying adjacent the thread; the arcuate surface adjacent one side of the thread being broader than the arcuate surface adjacent the other side of the thread throughout the length of the latter.

3. A screw having a stem with a helical thread of relatively large pitch, with a rounded recess or depression between the turns of said thread, the curvature of said recess being greater adjacent the under side of the thread.

4. A screw having a continuous helical thread, and a concaved groove continuous with said thread and lying between the same throughout the extent of said screw; said groove formed by curved surfaces having radii of different length which join a cylindrical portion of the stem, the surface of said cylindrical portion lying tangent to both of said curved portions.

5. A screw having a continuous helical thread of the same diameter throughout its length with a concaved groove continuous with said thread and lying between the same throughout the extent of said screw, said groove having curved surfaces adjacent the thread whose radii differ in length and which join a cylindrical portion of the stem, the plane of which cylindrical portion is tangent to both of said curved portions.

GEORGE W. WHITEMAN.